United States Patent
Skinner et al.

(10) Patent No.: US 7,305,019 B2
(45) Date of Patent: Dec. 4, 2007

(54) EXCIMER LASER WITH ELECTRON EMITTERS

(75) Inventors: Michael P. Skinner, San Jose, CA (US); Martha O. Neustadt, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 11/030,771

(22) Filed: Jan. 5, 2005

(65) Prior Publication Data

US 2006/0146905 A1    Jul. 6, 2006

(51) Int. Cl.
*H01S 3/097* (2006.01)
*H01S 3/08* (2006.01)

(52) U.S. Cl. .................................. 372/87; 372/101
(58) Field of Classification Search ............... 372/87, 372/101
See application file for complete search history.

(56) References Cited

U.S. PATENT DOCUMENTS

| 4,319,202 | A |   | 3/1982  | Schuoecker et al. |
| 4,890,035 | A |   | 12/1989 | Prein et al. |
| 5,012,482 | A | * | 4/1991  | Gray .......................... 372/74 |
| 5,550,435 | A | * | 8/1996  | Kuriyama et al. ....... 315/169.1 |
| 5,949,182 | A | * | 9/1999  | Shealy et al. ............... 313/345 |
| 5,965,972 | A |   | 10/1999 | Takada et al. |
| 6,479,938 | B1 | * | 11/2002 | Konuma .................. 315/169.1 |
| 6,764,366 | B1 |   | 7/2004  | Lee et al. |
| 2004/0202225 | A1 | * | 10/2004 | Maier et al. ................ 372/103 |

FOREIGN PATENT DOCUMENTS

JP    62242377    7/2007

OTHER PUBLICATIONS

Burden, A. P., "Materials for Field Emission Displays," International Materials Reviews 2001 (46) pp. 213-231.

* cited by examiner

*Primary Examiner*—Armando Rodriguez
(74) *Attorney, Agent, or Firm*—Schwabe, Williamson & Wyatt, P.C.

(57) ABSTRACT

An apparatus, system, and method for an excimer laser having lasing gas and electron emitters emitting electrons upon the application of an emitting voltage is described herein.

24 Claims, 7 Drawing Sheets

EXCIMER LASER WITH ELECTRON EMITTERS

FIELD

Embodiments of the present invention in general relate to the field of excimer laser design. More specifically, embodiments of the present invention relate to incorporating spatially patterned electron emitters in excimer lasers.

BACKGROUND

Excimer lasers have become the lasers of choice for many applications in the ultraviolet spectral region today. Excimer lasers generate ultraviolet lights by subjecting a mixture of noble and halogen gases to high-voltage electrical discharges. Under such conditions, the noble and halogen gases react to form unstable noble-gas halide dimers, which quickly disassociate to release ultraviolet lights.

Even though excimer lasers are quite useful, there are a few operational drawbacks associated with prior art designs. Some of these drawbacks result from the frequent high-voltage electrical discharges used in excimer lasers. These discharges tend to create sputtering of metal electrodes used in the lasers, with the sputtered materials being deposited inside the chamber impacting operation of the laser components. Furthermore, the sputtered material may react with halogen gases in the lasers to form metal halides, which removes one of the components of the lasing reaction and degrades the intensity of the light produced. Also, complex and expensive electrical components are required to generate and regulate these high-frequency high-voltage electrical discharges. Another drawback of these prior art lasers is that during operation negatively charged halogen gases may react with Silicon Oxide ($SiO_2$) contained in the optical lenses of the lasers. These reactions may degrade the transparency of the lenses, thereby leading to a costly refurbishing process.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. The terms "comprising," "having," and "including" are synonymous, unless the context dictates otherwise.

Figure 1:
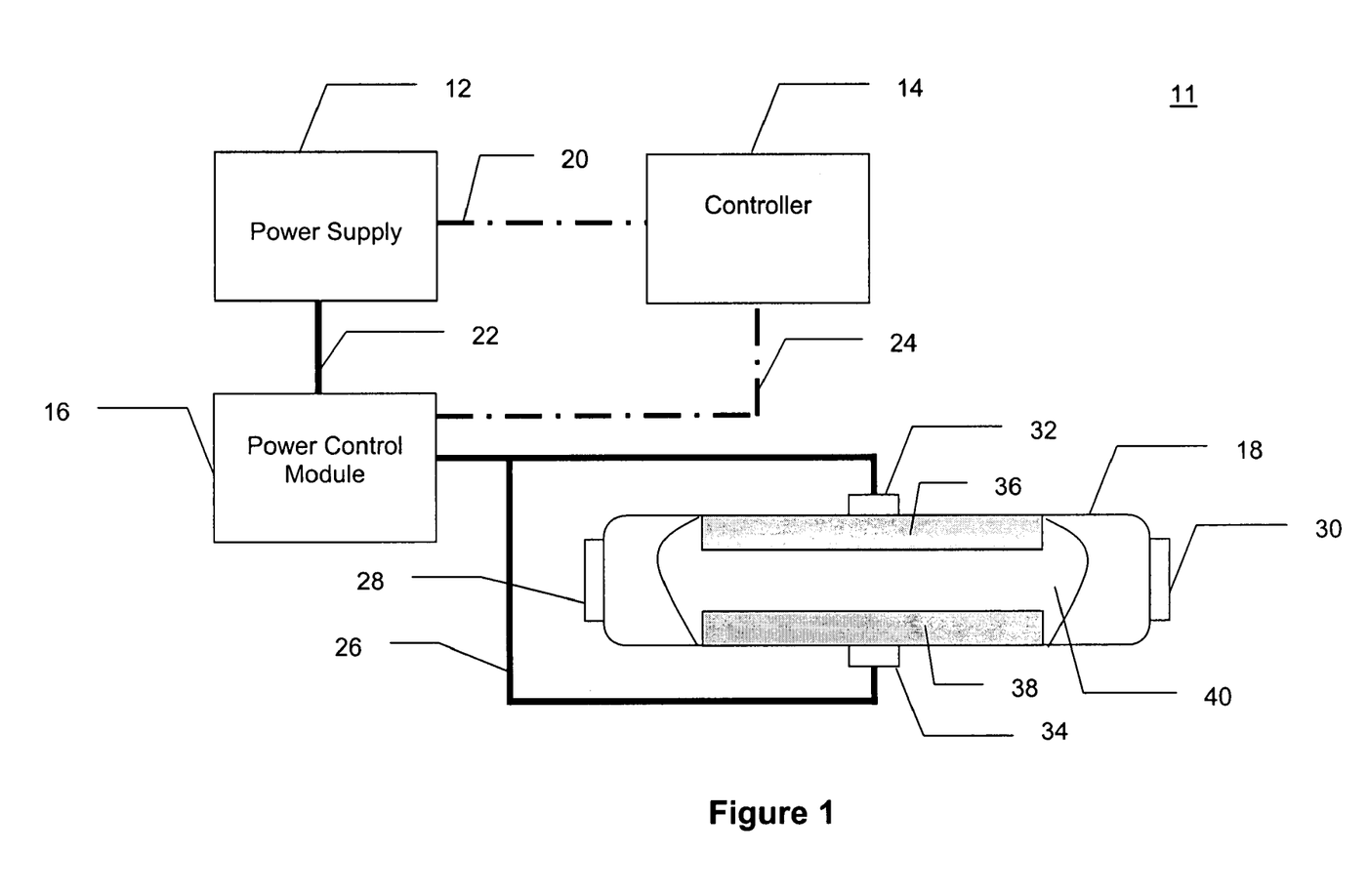
FIG. 1 is a block diagram of an excimer laser system according to one embodiment.

FIG. 1 is a functional block diagram of an excimer laser system 11, according to one embodiment of the present invention. As illustrated for the embodiment, the system 11 may include, but is not limited to, a power supply 12, a controller 14, a power control module 16, and a lasing chamber 18.

The power supply 12 may receive and regulate external power provided to the system 11. The power supply 12 may include, but is not limited to, power filters, surge suppressors, power regulators and monitors, backup power sources, and other components in order to condition the received external power. For delivering regulated power, the power supply 12 may be electrically coupled to the power control module 16 via an electrical connection 22.

The power control module 16 may receive regulated power from the power supply 12 and perform high-voltage generation and switching for the chamber 18. In one embodiment, the power control module 16 may convert the received power to high-voltage and/or low-voltage charges capable of discharging at a number of frequencies. To achieve such a conversion, the power control module 16 may include, but is not limited to, capacitors, voltage regulators, and high-voltage switches. In one embodiment, the power control module 16 may convert the received power to high-voltage direct current charges by utilizing, for example, insulated gate bipolar transistors, voltage regulators, and power filters. For delivering the generated charges, the power control module 16 may be electrically connected to the chamber 18 at connectors 32 and 34 via an electrical connection 26. The power control module 16 may be capable of delivering charges between a first electrode 36 and a second electrode 38, as well as between components of the second electrode 38.

Both the power supply 12 and the power control module 16 may be monitored and controlled by the controller 14 via control connections 20 and 24. The controller 14 may receive signals from, or deliver commands to, the power supply 12 and power control module 16 via connections 20 and 24 to monitor or regulate various operational parameters of these components. The controller 14 may be any digital or analog logic controller containing logic programming such as, but not limited to, a system logic controller (SLC), a program logic controller (PLC), a distributed control system (DCS), an embedded controller, a personal computer, or a microcomputer. In addition, the controller 14 may be integrated with either the power supply 12 or the power control module 16.

The chamber 18 may be used to apply electrical charges generated by the power control module 16 to produce ultraviolet (UV) light. The chamber 18 may be a hermetically sealed container with a lasing gas 40 disposed therein. In the described embodiment, the chamber 18 may include, but is not limited to, the first electrode 36, the second electrode 38 containing a plurality of electron emitters, the lasing gas 40 disposed between the first electrode 36 and the second electrode 38, a reflective surface 28, and a lens 30.

In various embodiments, the lasing gas 40 may include a noble gas or a noble gas halide. Examples of the lasing gas 40 could include, but are not limited to, Xenon (Xe), a mixture of Xe and F, a mixture of Xe and Chlorine (Cl), a mixture of Xe and Bromine (Br), a mixture of Xe and Iodine (I), a mixture of Krypton (Kr) and F, a mixture of Kr and Cl, or a mixture of Argon (Ar) and F in appropriate concentrations.

The first electrode 36 may include a metal electrode spaced apart from the second electrode 38. The second electrode 38 may include a plurality of spatially patterned electron emitters such as field-effect electron emitters, thermal-effect electron emitters, or a combination of both. As will be described in more detail, the plurality of electron emitters found in the second electrode 38 may facilitate the lasing operations of the system 11 being done with less energy, which in turn may result in an improvement in the overall performance of the system 11.

In addition, the system 11 may also include other components (not shown) including, but not limited to, a wavelength measurement/calibration unit and line-narrowing modules to monitor and regulate generated UV light. Such optical components may be integrated with, or detachable from, the system 11.

Figure 2:
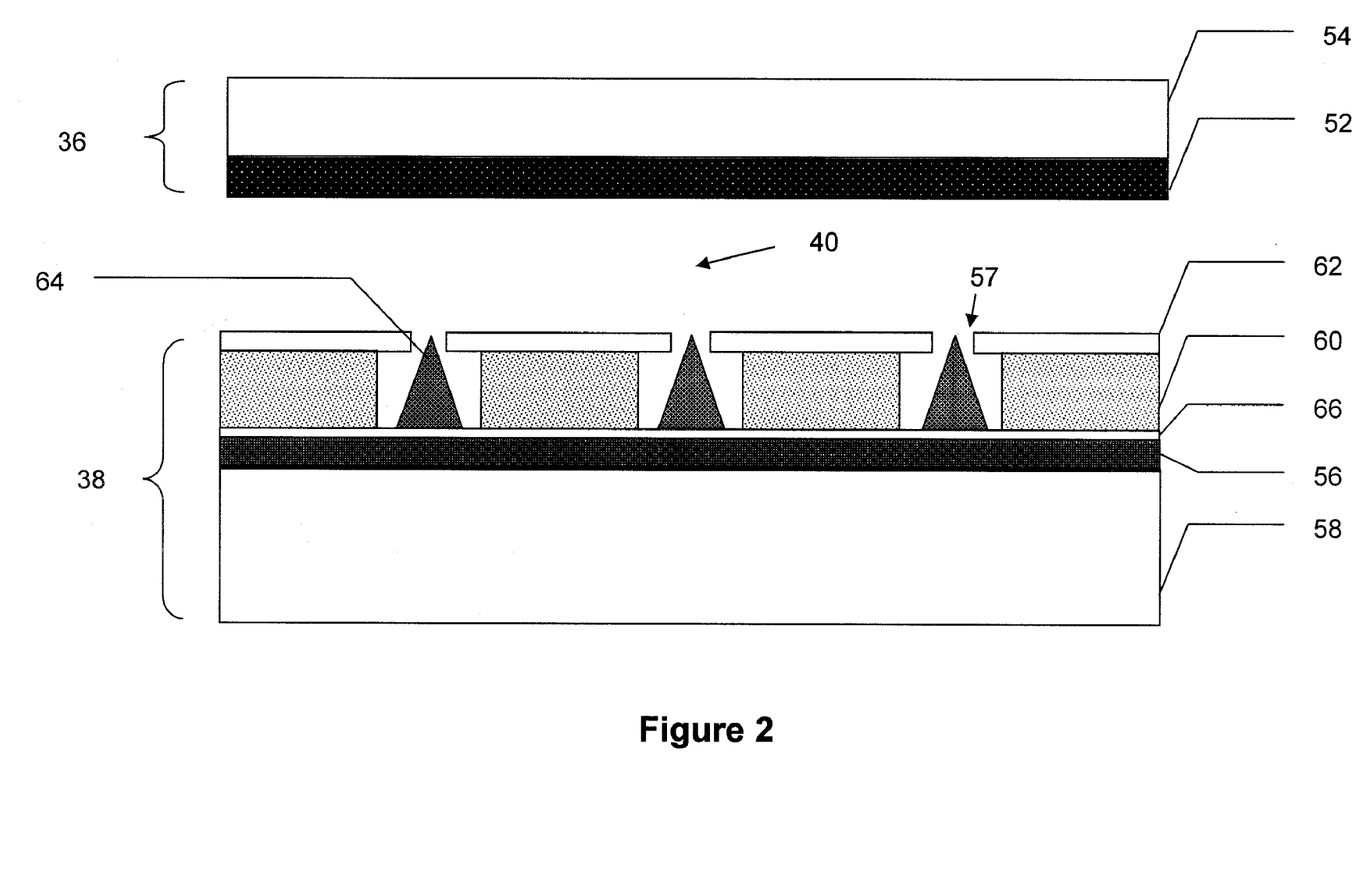
FIG. 2 illustrates a cross-sectional view of an excimer chamber utilizing an electron-emitting cathode plane according to one embodiment.

Operation of the system 11 will be discussed with reference to a chamber design of an embodiment of the present invention illustrated in FIG. 2. In this embodiment, the first electrode 36 may contain an insulating layer 54 and an anode 52 deposited or printed on the insulating layer 54. In various embodiments, the insulating layer 54 may be, but is not limited to, soda-lime glass, ceramic, or plastic. The insulating layer 54 does not need to be continuous, as shown, as the anode 52 may also be self-supporting. In various embodiments, the anode 52 may be constructed from any conductive material with a relatively high vapor pressure such as, but not limited to, Aluminum (Al), Indium Tin Oxide (ITO), Molybdenum (Mo), Titanium (Ti), Tungsten (W), and any combination or alloy thereof.

In one embodiment, the second electrode 38 may include a substrate 58, a cathode 56, a gate insulator 60, a gate 62, and spatially patterned electron emitters 64 disposed relative to each other as shown. The substrate 58 may be an insulator constructed from materials such as, but not limited to, a Silicon (Si) wafer, soda-lime glass, ceramic, or plastic and any combinations thereof. The cathode 56 may be a layer deposited or printed on the substrate 58 and may be constructed from any conductive material with a relatively high vapor pressure such as, but not limited to, Al, ITO, Ni, Mo, Ti, W, Si, and any combination or alloy thereof.

In one embodiment, a resistor 66 may be deposited or printed on the cathode 56 to faciltate even electron emission. The resistor 66 may be constructed from a material with even resistance distribution such as, but not limited to, Chromium Silicia (CrSi), Silicon Carbide (SiC), doped Si, amorphous Si, and any combination thereof.

The gate insulator 60 and the gate 62 may be coupled to the cathode 56 by first depositing the layer of selected materials on the cathode 56 and selectively etching or micromachining the deposited materials to define cavities. The gate insulator 60 may be constructed from any material with a high dielectric constant, for example, Silicon Oxide (SiO) or Aluminum Oxide (AlO). The gate 62 may be constructed from a conductive material such as, but not limited to, Al, ITO, Ni, Mo, Ti, W, Pt, and any combination thereof.

The electron emitters 64 may be spatially patterned and mounted in each of the cavities and be in electrical communication with the cathode 56. In this embodiment, the electron emitters 64 may be a plurality of field-effect microtip emitters 64, each terminating in a pointed tip that is separated from the gate 62 by a spacing 57. Although only three field-effect microtip emitters 64 are shown in FIG. 2, other embodiments may use any number of emitters. In one embodiment, the microtip emitters 64 may be mounted in each of the cavities by depositing selected material in a grazing incidence. Other embodiments may include other processes for forming the microtip emitters 64 including, e.g., evaporating emitter material above the cavity for accumulation in the cavity or etching the emitters 64 from bulk material.

In various embodiments the microtip emitters 64 may be metallic cones constructed from a material such as, but not limited to, Mo, Si, W, Hafnium (Hf), Si, and any combination thereof. These microtip emitters 64 may also be coated to enhance electron extraction. Examples of coating materials may include, but are not limited to, Zirconium Carbide (ZrC), Hafnium Carbide (HfC), Diamond, Silicon Dioxide ($SiO_2$), amorphous Carbon (C), Sulfur (S) doped Boron Nitride (BN), porous Si, and any combination thereof.

In operation, a relatively low emitting voltage (e.g., around 10V) may be applied between the microtip emitters 64 (via the cathode 56) and the gate 62 to create an electrical field. Activated by this electrical field, the microtip emitters 64 may emit electrons into the chamber. The emitting voltage and resulting electron emission may depend on, among other things, the spacing 57 between the microtip emitters 64 and the gate 62, the sharpness of the gate 62, and the position of the microtip emitters 64 in the gate hole.

The emission of electrons into the chamber may allow a lower initiation voltage required to cause the electrons to travel between the microtip emitters 64 and the anode 52. Or, said another way, electron emission from the emitters 64 may reduce the energy required to cause the electrons to jump the gap from the emitters 64 to the anode 52. The application of the initiation voltage and the resulting flow of electrons from the tips 62 to the anode 52 may ionize components of the lasing gas 40. For example, in an embodiment having a mixture of Ar and F as the lasing gas 40, the ionization of the Fluorine may be represented by the following equation:

$$F_2 + e- \Rightarrow F + F^-$$

The Fluorine ions may then associate with the noble gas component of the lasing gas 40, e.g., Ar, forming an excited dimer reaction as follows:

$$F^- + Ar \Rightarrow ArF^-$$

The formed dimer complex may have a very short lifespan (e.g., less than 5 nanoseconds) and may quickly disassociate to release UV light ($\lambda$) as follows:

$$ArF^- \Rightarrow Ar + F^- + \lambda$$

The released UV light may then be collected and transmitted through the lens 30.

Once the electron flow has been initiated between the microtip emitters 64 and the anode 52, a lasing voltage, which may be less than the initiation voltage, may be applied between the microtip emitters 64 and the anode 52 to sustain the lasing reaction of the gas 40. The lasing voltage may determine the acceleration of electrons from the emitters 64 to the anode 52, and therefore the intensity of the emitted light. Continued lasing may be facilitated by controlling the emitting voltage in a desired way. For example, a decreased lasing voltage, and associated intensity, may be compensated for by increasing the frequency of the emitting voltage. A decrease in the intensity of the light beam may, among other things, lower the heat absorbed by the lenses, which may, in turn result in less lens distortion to allow for greater resolution.

In one embodiment the relatively low emitting voltage between the gate 62 and the microtip emitters 64 may allow for a direct current application to trigger continuous electron emission throughout operation. In another embodiment, the emitting voltage may be pulsed to generate periodic electron emission throughout operation, which could allow for a wider range of operating frequencies that what is currently available.

The low voltage, low current requirements of this embodiment may enable the use of electronic devices, e.g., the power control module 16, capable of higher frequencies than the high voltage, high current requirements of current excimer laser systems. Additionally, the control electronics used may also allow for quicker power-up times of the system 11.

In one embodiment, a reduction in the voltage between the electrodes 36 and 38 may also decrease the amount of metal sputtered by the conductors. The amount of metal sputtered may be related to a square of the voltage between the electrodes 36 and 38. Therefore, reducing the voltage by half could result in a quarter of the amount of metal sputtered. A reduction in sputtered metal may reduce the redeposition of the metal inside the chamber, which could unnecessarily compromise the performance of the overall system 11. In current excimer laser systems, the redeposition of sputtered metal on the lens, mechanical surface, and insulators have led to deteriorated transmission properties, mechanical movements, and insulation, respectively. This reduction in sputtered material may further reduce its reaction with halides. This, in turn, could reduce the metal halide formation that reduces one of the reactive species and effects the intensity of the laser.

The spatial pattern of the microtip emitters 64 may be adapted to concentrate the electron cloud and lasing reaction in the area where it has the greatest benefit in terms of lasing intensity or uniformity. For example, one embodiment may have a higher density of the emitters 64 in the center of the chamber to provide for a greater collection and transmission of UV light. Additionally, in various embodiments the array of microtip emitters 64 may be individually activated, activated by section, or activated all at once. The emitting activation patterns may be adjusted to adapt to the objectives of a particular embodiment.

Figure 3:
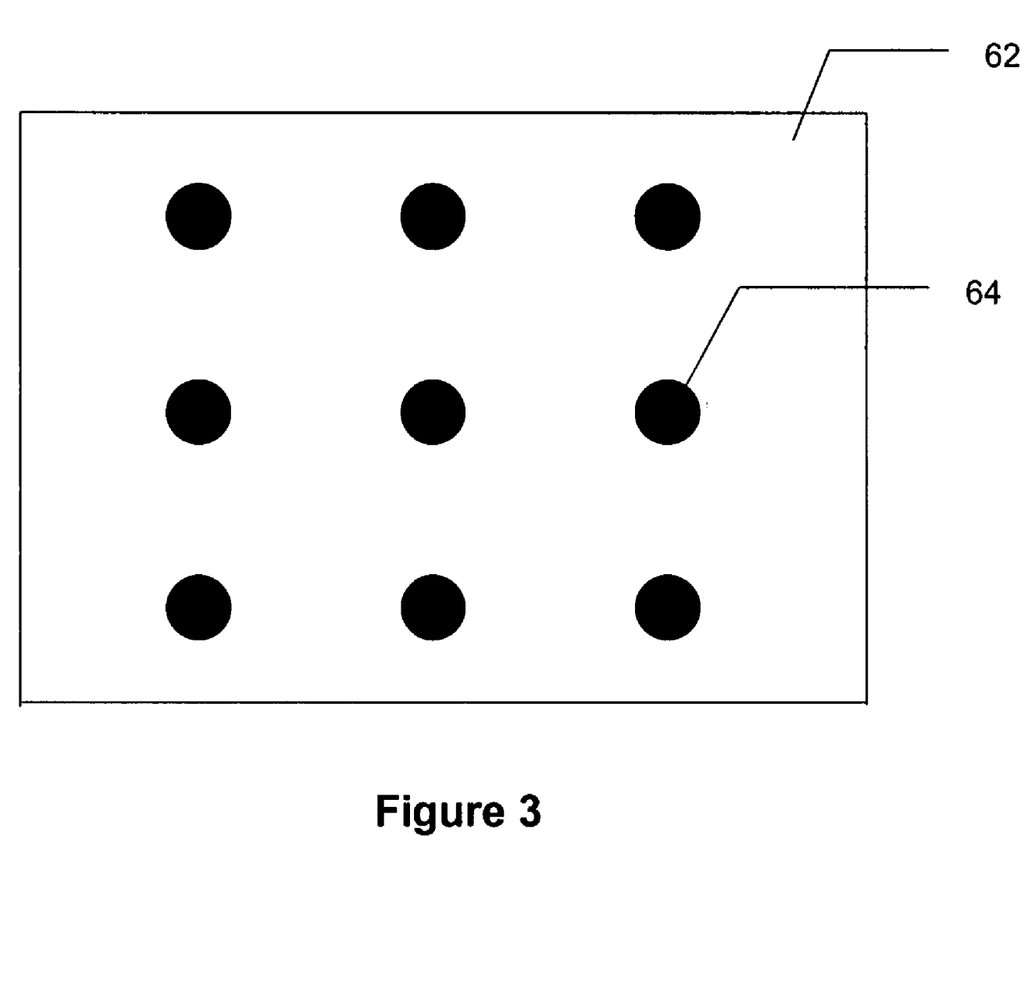
FIG. 3 illustrates a top view of the electron-emitting cathode plane of FIG. 2 according to one embodiment.

FIG. 3 shows a top view of the second electrode 38, in accordance with one embodiment. As illustrated, the second electrode 38 may contain an array of cavities formed by the gate 62 and a portion of the cathode 56. In the described embodiment, a 3×3 array of cavities is used for illustration; however, other embodiments may use arrays of other sizes as well as other patterns. As illustrated, within each cavity, one microtip emitter 64 may be mounted. The cavities may be evenly spaced to facilitate even electron emission by the microtip emitters 64, but are not so limited. In another embodiment, spacing may be adjusted in-line with the direction of lasing or in any pattern to facilitate the lasing operation.

Figure 4:
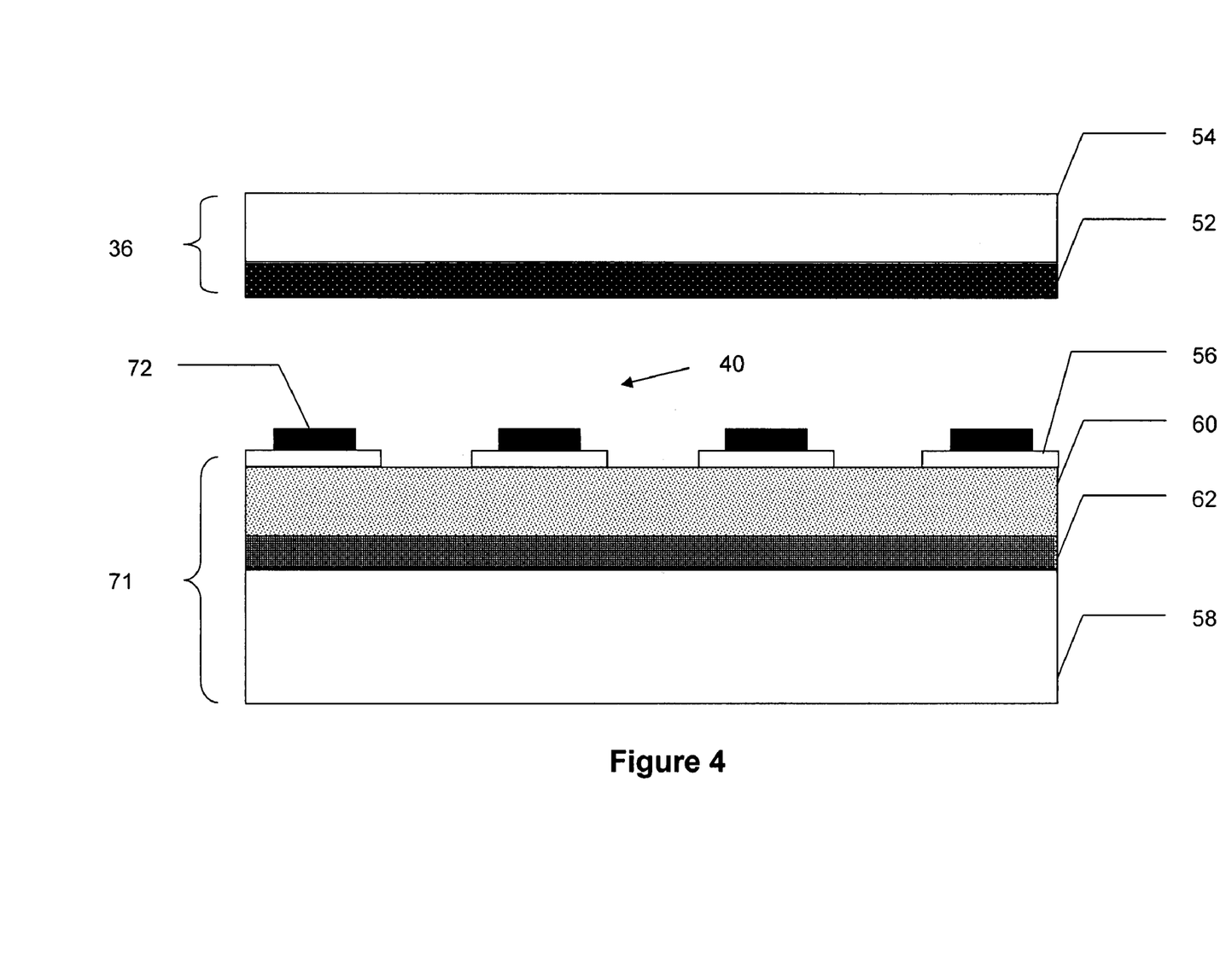
FIG. 4 illustrates a cross-sectional view of an excimer chamber utilizing a buried gate according to one embodiment.

FIG. 4 shows a cross-sectional view of a first electrode 36 and a second electrode 71, in accordance with another embodiment of the present invention. In this embodiment, the second electrode 71, which may be interchangeable with the second electrode 38 described above, may include a layer of insulator 60 deposited or printed upon the gate 62. Spaced cathodes 56 may be coupled to the insulator 60 by first depositing a layer of selected materials and then selectively etching the deposited materials. Electron emitters such as, e.g., carbon nanotube emitters 72, may be spatially patterned and stacked on each spaced cathode 56 by depositing selected materials in a grazing incidence. In the described embodiment, four carbon nanotube emitters 72 are illustrated, though any number of carbon nanotube emitters may be used.

In operation, when an emitting voltage is applied between the cathodes 56 and the gate 62, the nanotube emitters 72 may emit electrons into the chamber. The remaining lasing operation may then take place in a manner similar to the one described above, with reference to FIG. 1.

Figure 5:
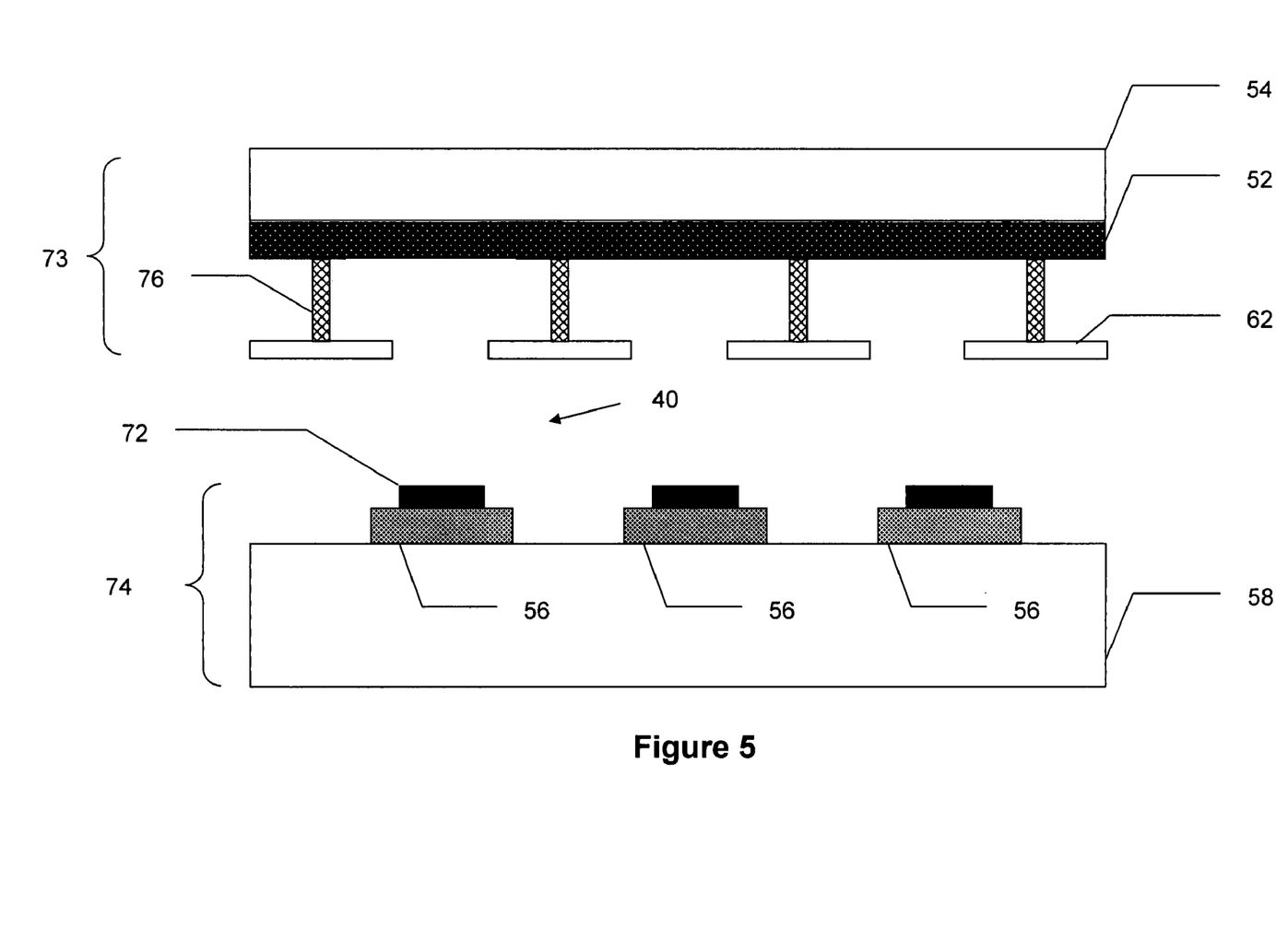
FIG. 5 illustrates a cross-sectional view of an excimer chamber utilizing remote gates according to one embodiment.

FIG. 5 shows a cross-sectional view of a first electrode 73 and a second electrode 74, in accordance with another embodiment of the present invention. In this embodiment, the second electrode 74 may include spaced cathodes 56 deposited on the substrate 58 by selectively etching or micromachining a first deposited cathode layer. The cathodes 56 may be spaced to facilitate desired electron emission. Electron emitters may be spatially patterned and mounted on the cathodes 56. Suitable electron emitters include, but are not limited to, carbon nanotube emitters 72.

In one embodiment, the first electrode 73 may include a plurality of gates 62 coupled to the anode 52 via a plurality of spacers 76. Spacers 76 may be constructed from any electrically non-conducting material such as, but not limited to, glass, plastic, ceramic, Si, and any combination thereof. Each gate 62 may be offset from each spaced cathode 56 and nanotube emitter 72. Upon application of an emitting voltage between cathodes 56 and gates 62, nanotube emitters 72 may emit electrons into the chamber. The remaining lasing operation may then take place in a manner similar to the one described above, with reference to FIG. 1.

Figure 6:
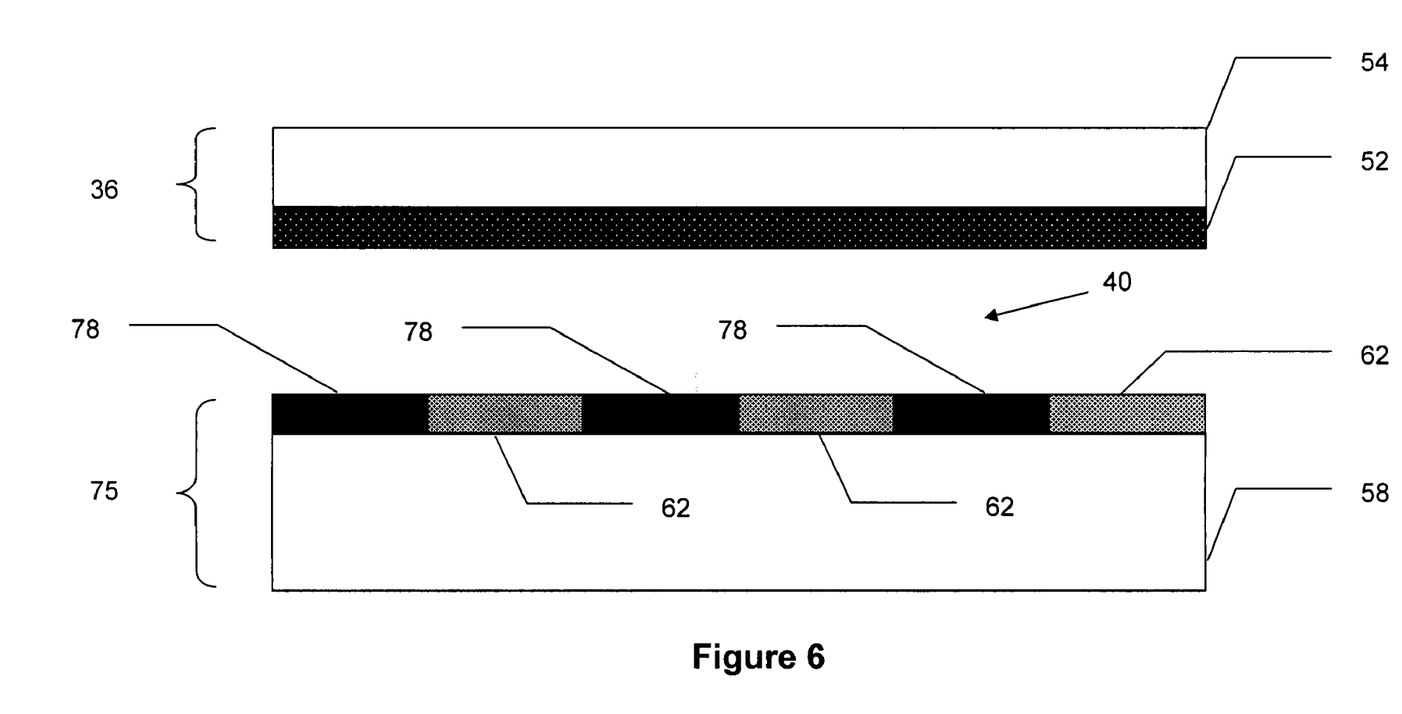
FIG. 6 illustrates a cross-sectional view of an excimer chamber utilizing surface conduction emitters, according to one embodiment.

FIG. 6 shows a cross-sectional view of a first electrode 36 and a second electrode 75, in accordance with another embodiment of the present invention. In this embodiment, the second electrode 75, which may be interchangeable with electrode 38, may include spaced gates 62 deposited on the substrate 58 by selectively etching or micromachining a first deposited cathode layer. Then, electron emitters, such as, but not limited to, flat ultrafine particle film emitters 78 of Palladium Oxide (PdO), for example, may be deposited in between the gates 62.

In operation, when a voltage is applied between the gates 62 the particle film emitters 78 may emit electrons into the chamber. The remaining lasing operation may then take place in a manner similar to the one described above, with reference to FIG. 1.

Although the embodiments illustrated above utilize field-effect electron emitters, thermal-effect electron emitters may be equally suitable. Examples of thermal-effect electron emitters include, but are not limited to, Zirconium Oxide (ZrO)/W thermal field emitters.

Figure 7:
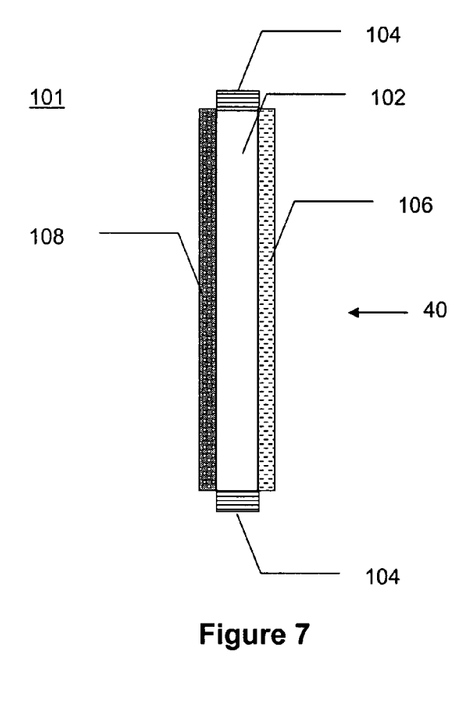
FIG. 7 illustrates a cross-sectional view of an excimer laser lens, according to one embodiment.

FIG. 7 shows a cross-sectional view of a lens 101, in accordance with an embodiment of the present invention. As illustrated, the lens 101 may include, but is not limited to, a transparent element 102, an optical coating 108, a protective coating 106, and a support 104. The lens 101 may be suitably interchanged with lens 28 described in reference to earlier embodiments.

In the present embodiment, the transparent element 102 may be constructed from any material that transmits UV light, such as, but not limited to, a crown glass and a flint glass. The transparent element 102 may be reinforced by the support 104 constructed from a rigid material such as, but not limited to, metal, plastic, ceramic, and any combination thereof. The lens 101 may also include the optical coating 108 for optical conditioning such as, but not limited to, providing desired antireflection, polarization, reflection and/or focal properties. The optical coating 108 may be provided as a thin or thick film of organic or inorganic materials.

In one embodiment, the lasing gas facing (or inside) surface of the transparent element 102 may be coated with the protective coating 106 having an optical density corresponding to desired transmittance rates of the lens 101. The protective coating 106 may be adapted to prevent reactions between the transparent element 102 and components of the lasing gas 40 (e.g., halogen ions). For example, in one embodiment, $F^-$ may react with a transparent element constructed of Silicon Dioxide ($SiO_2$). In this, and similar embodiments, the protective coating 106 may contain a perfluorinated material such as, but not limited to, Teflon, Calcium Fluoride (CaFl), Magnesium Fluoride (MgFl), and any combination thereof. The perfluorinated protective coating 106 may inhibit the $F^-$ from reacting with the transparent element 102 due to the fluorine saturation of the protective coating 106.

The perfluorinated protective coating 106 may be deposited onto the transparent element 102 along with a copolymer, e.g., polyethylene or any similar straight chain carbon compound with a low ultraviolet (UV) absorption. A protective coating/copolymer composition may, upon application, naturally phase separate to present the lower surface tension material (e.g., the protective coating) to the outer surface, allowing the copolymer to attach to the transparent element 102. In another embodiment, the protective coating 106 may be grafted onto a polyalkaline with a similar result.

In another embodiment, the protective coating 106 may contain a metal such as, but not limited to, Mo, Ni, Al, and any combination thereof. A metal protective coating may be deposited onto the transparent element 102 as a translucent thin film. In operation, before lasing reaction is started, the metal protective coating may be negatively charged such that negatively charged ions of the lasing gas 40 may be repelled from transparent element 102.

In yet another embodiment, the protective coating 106 may contain a sacrificial material that may react with ions from the lasing gas 40. Examples of such a sacrificial material include, but are not limited to, polyethylene and polypropylene. During use, in an embodiment having negatively charged halogens ions, those ions may react with the sacrificial protective caoting thereby protecting the underlying lens. For example, in one embodiment the sacrificial material may include an oxidizer that is adapted to oxidize fluoride ions of the lasing gas to release $F_2$.

The above-disclosed embodiments of the lens 101 may also be combined in use. For example, the protective coating 106 may contain a layer of perfluorinated material and an additional metal layer, or a layer of perfluorinated material and a layer of sacrificial material. Optionally, the protective coating 106 may also contain optical conditioning layers as well. Such optical conditioning layers may be placed between the transparent element 102 and the protective layers of the protective coating 106.

Figure 8:
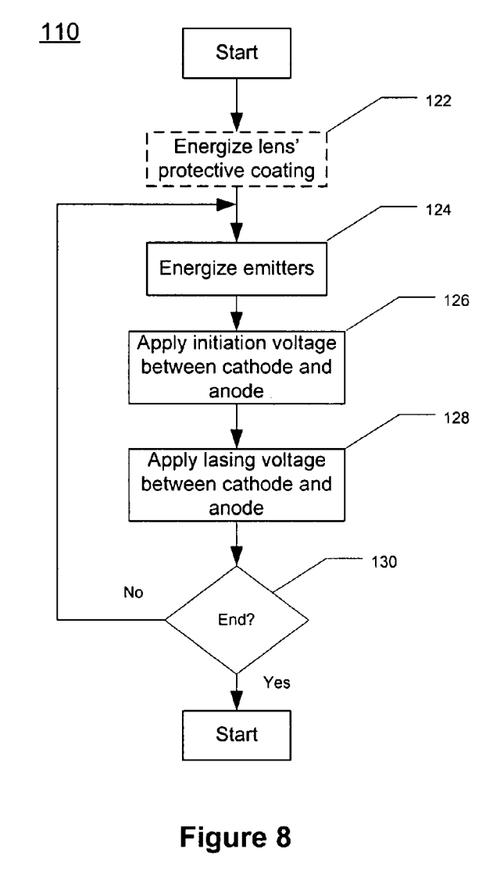
FIG. 8 is a flow diagram showing a method of operating an excimer laser, according to one embodiment.

FIG. 8 is a flow diagram 110 showing a method of operating an excimer laser, in accordance with a further embodiment. The method of operation of this embodiment may be done with components similar to like components referenced in the above embodiments. As an initial optional operation, the lens with a metal protective coating may be negatively charged to protect the transparent element from degradation 122. If the protective coating only includes perfluorinated or sacrificial material, this operation may be skipped.

Electron emitters may then be activated to emit electrons into the lasing gas 124. In one embodiment, activating electron emitters may involve applying a predetermined emitting voltage between the appropriate conductors to induce field-effect or thermal-effect electron emission. Controlling an individual electron emitter or a group of electron emitters by section may facilitate desired emission.

After sufficient time is given, an initiation voltage may be applied between the cathode and the anode to start a lasing reaction 126. After electron flow from the cathode to the ion is established, a lasing voltage may be applied between the cathode and the anode 128.

After the lasing reaction occurs, a selection may be performed 130. If such a lasing reaction is no longer needed, for example, a user command to shut down the system is received and the process ends; otherwise, the process may revert back to block 124.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus, comprising:
   a first electrode;
   a second electrode, spaced apart from the first electrode, including
      a cathode,
      an insulator coupled to the cathode,
      a gate coupled to the insulator, and
      a plurality of electron emitters electrically coupled to the cathode and adapted to emit electrons upon the application of the emitting voltage between the cathode and the gate;
   a lasing gas disposed between the first electrode and the second electrode;
   a chamber hermetically enclosing the first electrode, the second electrode, and the lasing gas;
   an optical lens mounted at an end of the chamber, the optical lens including a transparent element and a first coating coupled to at least a portion of a surface of the transparent element, the first coating being adapted to protect the transparent element;
   a resistor coupling the insulator to the cathode;
   a plurality of cavities defined, at least in part, by portions of the resistor, the insulator, and the gate; and
   the plurality of electron emitters being correspondingly disposed inside the plurality of cavities.

2. The apparatus of claim 1, wherein the resistor is constructed with at least a material selected from a group consisting of Chromium Silicon Carbide, and doped Silicon.

3. An apparatus, comprising:
a first electrode;
a second electrode, spaced apart from the first electrode, including
a gate;
an insulator coupled to the gate;
a plurality of electron emitters correspondingly coupled to the plurality of cathodes and adapted to emit electrons upon application of the emitting voltage between the gate and the plurality of cathodes;
a lasing gas disposed between the first electrode and the second electrode;
a chamber hermetically enclosing the first electrode, the second electrode, and the lasing gas; and
an optical lens mounted at an end of the chamber, the optical lens including a transparent element and a first coating coupled to at least a portion of a surface of the transparent element, the first coating being adapted to protect the transparent element.

4. The apparatus of claim 3, wherein a first of the plurality of electron emitters comprise electron emitters formed with carbon nanotubes.

5. An apparatus, comprising:
a first electrode, the first electrode having;
an anode;
an insulating spacer coupled to the insulating insulator;
a second electrode, spaced apart from the first electrode, including a plurality of electron emitters adapted to emit electrons upon application of an emitting voltage;
a lasing gas disposed between the first electrode and the second electrode;
a chamber hermetically enclosing the first electrode, the second electrode, and the lasing gas; and
an optical lens mounted at an end of the chamber, the optical lens including a transparent element and a first coating coupled to at least a portion of a surface of the transparent element, the first coating being adapted to protect the transparent element.

6. The apparatus of claim 5, wherein the second electrode further comprises:
a plurality of spaced cathodes; and
the plurality of electron emitters correspondingly coupled to the plurality of spaced cathodes; and
at least one of the plurality of electron emitters adapted to emit electrons upon application of the emitting voltage between the corresponding spaced cathode and the gate.

7. The apparatus of claim 6, wherein a first of the plurality of electron emitters comprise electron emitters formed with carbon nanotubes.

8. The apparatus of claim 3, wherein
the first coating is adapted to protect the transparent element from ions of the lasing gas.

9. The apparatus of claim 3, wherein the optical lens further comprises:
a second coating coupled to the transparent element and adapted to provide the lens with a predetermined optical conditioning property.

10. A system, comprising:
a chamber hermetically enclosing
a first electrode,
a second electrode, spaced apart from the first electrode, including a plurality of electron emitters adapted to emit electrons upon application of an emitting voltage, and
a lasing gas disposed between the first electrode and the second electrode;
a power control module electrically couple to the chamber and adapted to provide power to the chamber, and the power control module modulating a current flow between a first of the plurality of electron emitters and the first electrode with the emitting voltage;
an optical lens mounted at an end of the chamber including a transparent element having a surface adjacent the lasing gas, a first coating coupled to the surface and adapted to protect the transparent element, and
a second coating coupled to the transparent element and adapted to provide the lens with predetermined optical conditioning property.

11. A method comprising:
applying a first voltage between a gate and a first electron emitter of a first electrode;
emitting electrons from the first electron emitter into a lasing gas disposed between the first electrode and a second electrode;
protecting an optical lens adjacent to the lasing gas from ions of the lasing gas; and
applying a second voltage, that is greater than the first voltage, between the first electron emitter and the second electrode to produce a lasing reaction with the lasing gas.

12. The method of claim 11, wherein said protecting an optical lens comprises:
electrically charging a conductive coating layer on the optical lens such that ions of the lasing gas are repelled from the optical lens.

13. The method of claim 11, wherein the applying of the second voltage further comprises applying a selected one of an alternating current voltage or a direct current voltage.

14. The method of claim 11, wherein the applying of the second voltage comprises applying a constant voltage between the first electron emitter and the second electrode, and the method further comprises:
modulating a current flow between the first electron emitter and the second electrode with the first voltage.

15. The method of claim 14, wherein the applying of the first voltage is performed using a selected one of a direct current and an alternating current.

16. An apparatus comprising:
a lasing chamber having
a first electrode;
a second electrode, spaced apart from the first electrode, the first electrode and the second electrode adapted to ionize a lasing gas disposed between the first and second electrode upon application of a voltage; and
an optical lens including a transparent element and a coating coupled to at least a portion of a surface of the transparent element, the coating being adapted to protect the transparent element from ions of a lasing gas; and
an one or more electrical connectors, coupled to the lasing chamber, adapted to facilitate the application of the first voltage.

17. The apparatus of claim 3, wherein the first coating is a conductive coating layer adapted to receive an applied charge to repel ions of the lasing gas from the optical lens.

18. The apparatus of claim 3, wherein the plurality of electron emitters are adapted to be individually activated.

19. The apparatus of claim 3, wherein the plurality of electron emitters are disposed at different densities.

20. The system of claim 10, wherein the first coating is a sacrificial material adapted to oxidize ions of the lasing gas.

21. The apparatus of claim 16, wherein the coating is a conductive coating layer adapted to receive an applied charge to repel ions of the lasing gas from the optical lens.

22. The apparatus of claim 16, wherein the coating is a sacrificial material adapted to oxidize ions of the lasing gas.

23. The apparatus of claim 3, wherein a first of the plurality of electron emitters comprise electron emitters formed with at least a material selected from a group consisting of Molybdenum, Silicon, and Tungsten.

24. The system of claim 10, wherein the first coating comprises a mterial selected from a group consisting of a perfluorinated organic material and a fluoride inorganic material.

* * * * *

UNITED STATES PATENT AND TRADEMARK OFFICE
CERTIFICATE OF CORRECTION

PATENT NO. : 7,305,019 B2
APPLICATION NO. : 11/030771
DATED : December 4, 2007
INVENTOR(S) : Skinner et al.

It is certified that error appears in the above-identified patent and that said Letters Patent is hereby corrected as shown below:

Title Page;
Face of Patent
Under (56) References Cited, please include:
2003/0219056 A1 11/2003 Yager et al.

Column 8
Line 67, "[Claim 2.]...consisting of Chromium Silicon Carbide, and doped Silicon." should read
--...consisting of Chromium Silica, Silicon Carbide, and doped Silicon.--.

Column 9
Lines 4-12, "[Claim 3.]...,
  Including
  a gate;
  an insulator coupled to the gate;
  a plurality of electron emitters correspondingly coupled to the plurality of cathodes and adapted to emit electrons upon application of the emitting voltage between the gate and the plurality of cathodes;
  a lasing gas disposed between the first electrode and the second electrode;..."

should read --..., including
  a gate,
  an insulator coupled to the gate,
  a plurality of cathodes coupled to the insulator, and
  a plurality of electron emitters correspondingly coupled to the plurality of cathodes and adapted to emit electrons upon application of the emitting voltage between the gate and the plurality of cathodes;
  a lasing gas disposed between the first electrode and the second electrode;--.

Column 9
Lines 23-27, "[Claim 5.]..., comprising:
  a first electrode, the first electrode having;
  an anode;
  an insulating spacer coupled to the insulating insulator;
  a second electrode; spaced apart from...".

should read --..., comprising:
  a first electrode, the first electrode having
  an anode,
  an insulating spacer coupled to the anode, and
  a gate coupled to the insulating insulator;
  a second electrode, spaced apart from...--.

CERTIFICATE OF CORRECTION (continued)
U.S. Pat. No. 7,305,019 B2

Column 10
Line 50, "[Claim 16.]...first and second electrode..." should read --...first and second electrodes...--.
Line 57, "[Claim 16.] an one or more electrical connectors, ..." should read --...one or more electrical connectors, ...--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,305,019 B2  
APPLICATION NO. : 11/030771  
DATED : December 4, 2007  
INVENTOR(S) : Skinner et al.

Page 1 of 2

It is certified that error appears in the above-identified patent and that said Letters Patent is hereby corrected as shown below:

Title Page;  
Face of Patent  
Under (56) References Cited, please include:  
2003/0219056 A1 11/2003 Yager et al.  
2004/0256975 A1 12/2004 Gao et al.

Column 8  
Line 67, "[Claim 2.]...consisting of Chromium Silicon Carbide, and doped Silicon." should read --...consisting of Chromium Silica, Silicon Carbide, and doped Silicon.--.

Column 9  
Lines 4-12, "[Claim 3.]...,  
  Including  
  a gate;  
  an insulator coupled to the gate;  
  a plurality of electron emitters correspondingly coupled to the plurality of cathodes and adapted to emit electrons upon application of the emitting voltage between the gate and the plurality of cathodes;  
  a lasing gas disposed between the first electrode and the second electrode;..."

should read --..., including  
  a gate,  
  an insulator coupled to the gate,  
  a plurality of cathodes coupled to the insulator, and  
  a plurality of electron emitters correspondingly coupled to the plurality of cathodes and adapted to emit electrons upon application of the emitting voltage between the gate and the plurality of cathodes;  
  a lasing gas disposed between the first electrode and the second electrode;--.

This certificate supersedes the Certificate of Correction issued March 16, 2010.

Signed and Sealed this

Eleventh Day of May, 2010

David J. Kappos  
*Director of the United States Patent and Trademark Office*

CERTIFICATE OF CORRECTION (continued)
U.S. Pat. No. 7,305,019 B2

Column 9
Lines 23-27, "[Claim 5.]..., comprising:
  a first electrode, the first electrode having;
  an anode;
  an insulating spacer coupled to the insulating insulator;
  a second electrode; spaced apart from...".

should read --..., comprising:
  a first electrode, the first electrode having
  an anode,
  an insulating spacer coupled to the anode, and
  a gate coupled to the insulating insulator;
  a second electrode, spaced apart from...--.

Column 10
Line 50, "[Claim 16.]...first and second electrode..." should read --...first and second electrodes...--.
Line 57, "[Claim 16.] an one or more electrical connectors,..." should read --...one or more electrical connectors,...--.